May 24, 1938. W. W. BARDSLEY 2,118,136
SERVING APPARATUS
Filed Dec. 17, 1936 4 Sheets-Sheet 1

Inventor:
Willard W. Bardsley
By
Attorneys.

May 24, 1938.  W. W. BARDSLEY  2,118,136
SERVING APPARATUS
Filed Dec. 17, 1936   4 Sheets-Sheet 2

Inventor:
Willard W. Bardsley
By
Attorneys.

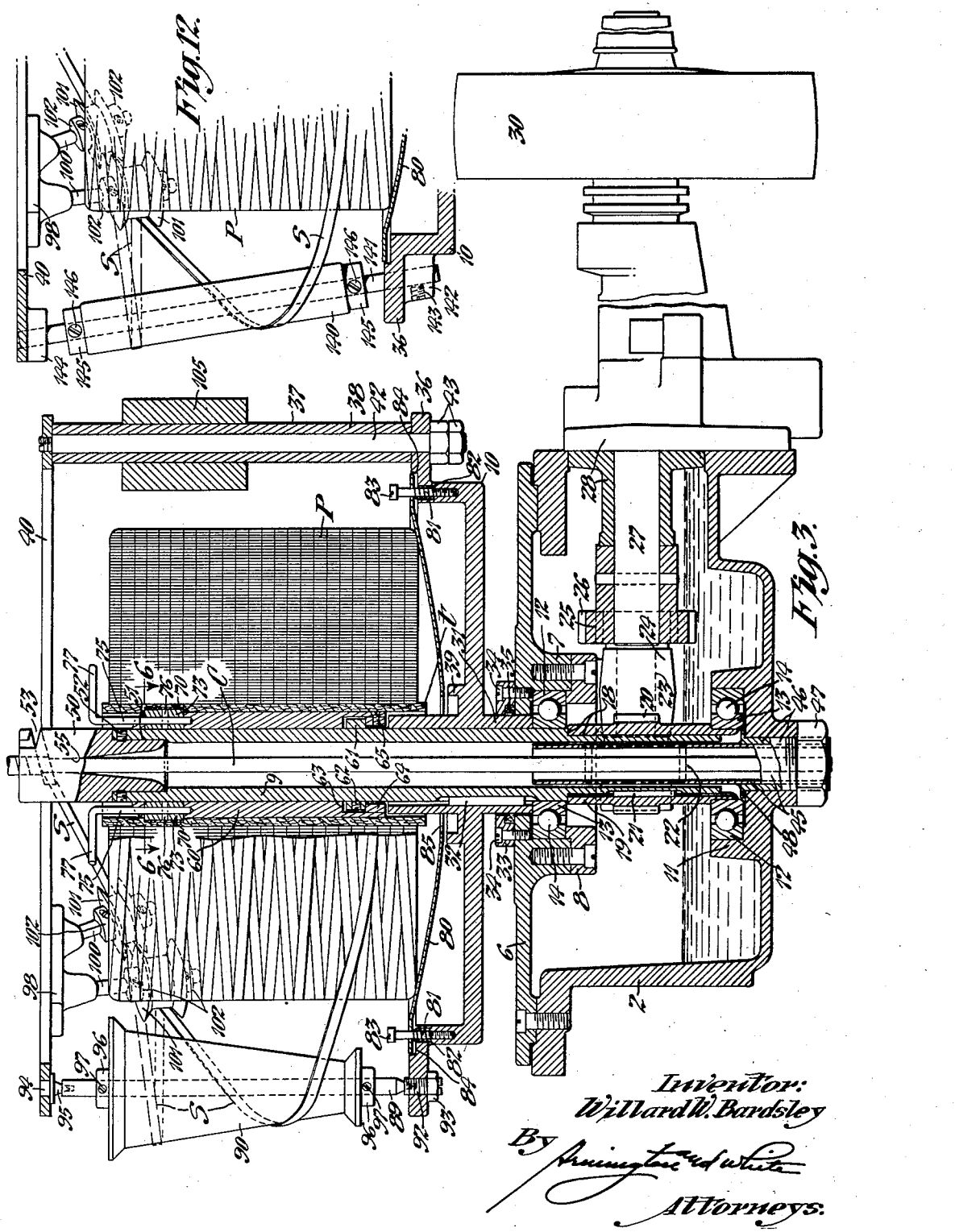

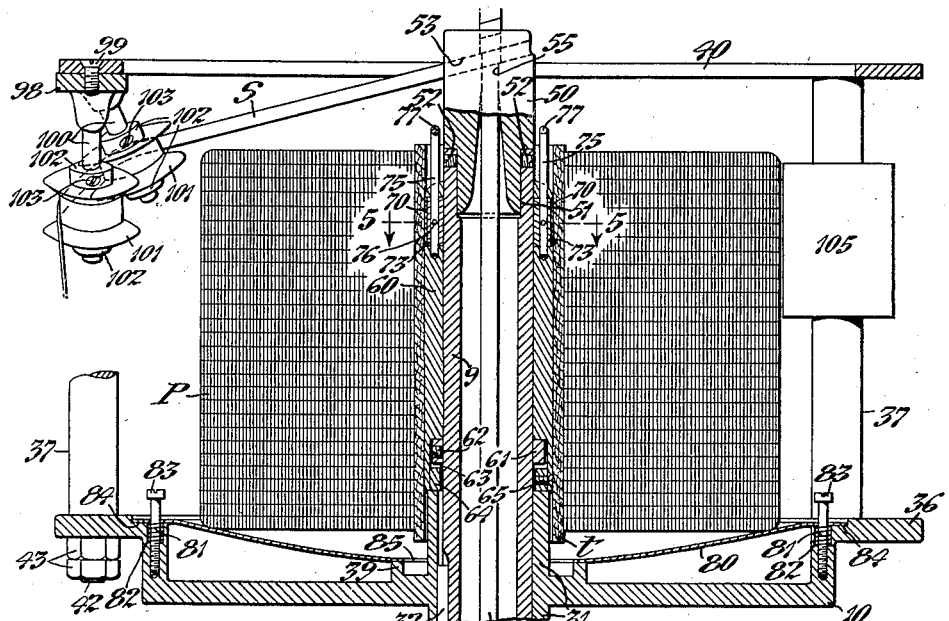

Patented May 24, 1938

2,118,136

UNITED STATES PATENT OFFICE 2,118,136

SERVING APPARATUS

Willard W. Bardsley, Providence, R. I., assignor to Wardwell Braiding Machine Company, Central Falls, R. I., a corporation of Maine Application December 17, 1936, Serial No. 116,374

12 Claims. (Cl. 117—42)

This invention relates to improvements in machines or apparatus for serving attenuated material onto a core. As herein described and illustrated, by way of example, the invention is embodied in a machine for serving or wrapping a flat, tape-like strip of paper or the like helically about an electric conductor such as a wire as the latter is fed through the machine. It is to be understood, however, that the present apparatus may be used for serving other types of material such as textile strands onto elastic or other cores, all within the scope and purview of the invention.

One object of the invention is to provide a machine or apparatus of the type indicated embodying a flyer rotatable about a core and carrying a supply of the strip material with means for serving the latter helically onto the core while applying a uniform tension to the delivering strand from start to finish of unwinding the supply.

Another object of the invention is to provide a machine of the type indicated having means for feeding the strip from the supply to the core with a constant rate of delivery of the strand as it unwinds from one end of the supply to the other end, or from its center outwardly toward its ends.

Another object of the invention is to provide in a machine of the type indicated means for mounting a cylindrical or similarly shaped package of the serving material coaxially with the feeding core for rotation about the core and for regulating the turning movement of the package to control the unwinding of the material therefrom.

Another object of the invention is to provide a machine of the type indicated having means for preventing the material from unwrapping from the part of the core which has been covered when the wrapping material breaks or its end runs out.

Another object of the invention is to provide a machine of the type indicated adapted to serve the material onto the core with a smooth uniform wrap without faults or blemishes in the covering.

Further objects of the improvement are set forth in the following specification which describes a preferred form of construction of the invention, by way of example only, as illustrated by the accompanying drawings. In the drawings:

Fig. 3 is an enlarged vertical sectional view of the head and its driving mechanism on line 3—3 of Fig. 2;

Fig. 4 is a sectional view of the head on line 4—4 of Fig. 2 illustrating the method of applying the package of serving material thereto;

Fig. 5 is an enlarged sectional plan view on line 5—5 of Fig. 4 showing the spring-finger gripping means for holding the package of serving material on its mandrel;

Fig. 6 is a similar sectional plan view on line 6—6 of Fig. 3 showing the spring-fingers engaged with the interior of the tube which supports the supply-package;

Fig. 7 is a fragmentary sectional view on line 7—7 of Fig. 5 showing the mounting for the spring-fingers of the gripping means;

Fig. 12 is a fragmentary view of the flyer showing a still further modification in the form of the take-up roll.

The present improved machine comprises in general a rotating head or flyer having means for supporting a package of strip or strand material coaxially thereof, means for applying resistance to the rotation of the package with respect to the flyer, means for guiding the strand from the package and feeding it to the core obliquely thereof, means for maintaining a constant rate of delivery of the strand or strip as it unwinds between the ends of the package, means for supporting a reserve supply of packages surrounding the core above the serving package, and certain other novel features of construction and arrangement as will be later pointed out.

For convenience of description the serving or wrapping material is hereinafter referred to as a "paper strip" and its supply as a "package", but it is to be understood that other forms of strand material and other types of supply may be employed on the present machine.

Figure 1:
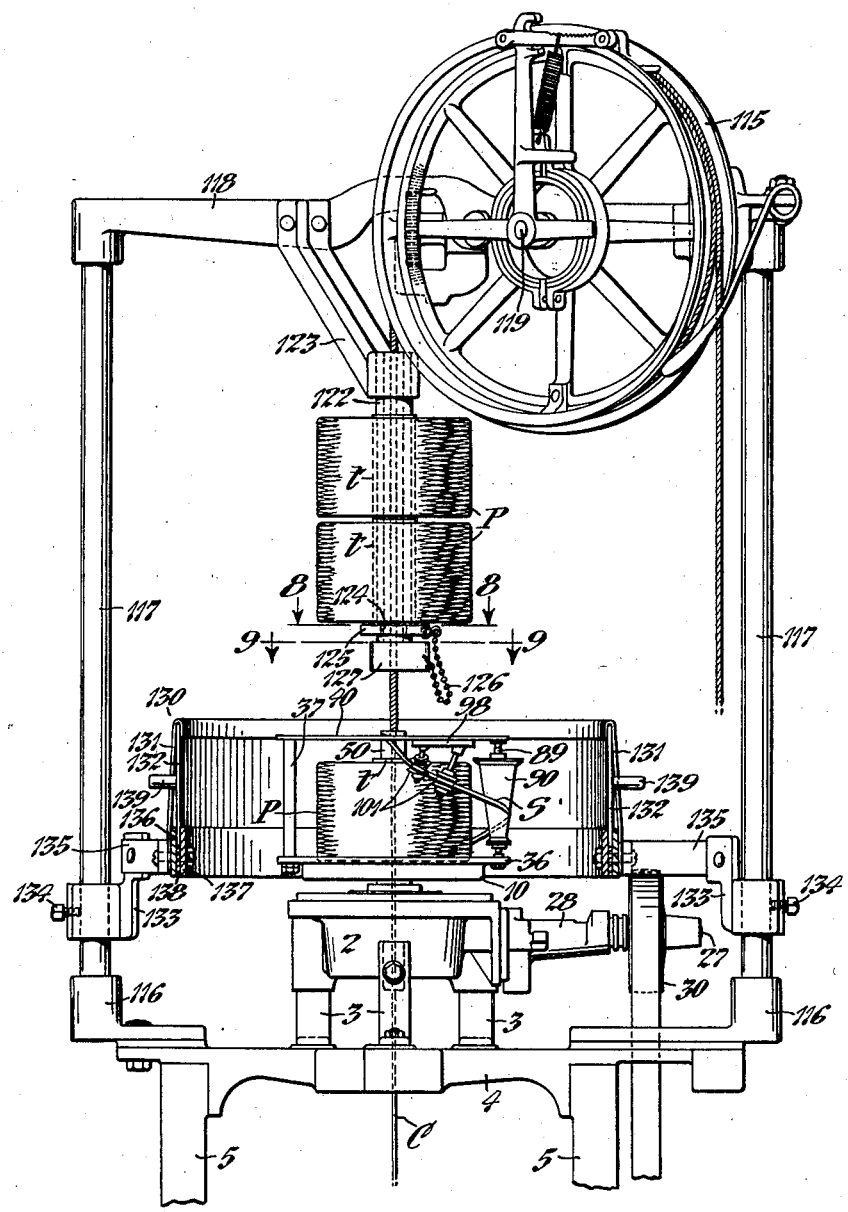
Fig. 1 is an elevational view of a machine embodying the present invention.

Referring to Figs. 1 and 3 of the drawings, the machine as herein illustrated is constructed with a chambered base 2 supported from angle-shaped legs 3 which are secured to a frame or table 4 mounted on legs 5 which rest on the floor. The base 2 provides a housing for the driving mechanism of the machine and carries bearings for a vertical shaft or spindle 9 for rotating the head or flyer 10. The vertical shaft or spindle 9 is of hollow or tubular construction supported in antifriction bearings in the base 2 in the manner as next described.

In the bottom of the base 2 is a step-bearing 11 in which is mounted a fixed annular race 12 opposed to an inner race 13, carried by the spindle 9, with balls 14 therebetween. A cover 6 on the base 2 is provided with a hub 7 carrying an outer race 12 similar to that of the step-bearing and opposed to an inner race 13 on the spindle 9 with balls 14 therebetween. The outer race 12 is held in the hub 7 of the cover 6 by means of an underlying ring 8 bolted to the cover as shown in Fig. 3. The spindle or shaft 9 is shouldered at 18 and reduced in diameter below the upper bearing to receive the elongate hub 19 of a gear 20 which is keyed thereto at 21. The lower end of the hub 19 of the gear 20 is reduced in diameter to receive the inner race 13 of the step-bearing 11 above described, while the inner race 13 of the upper bearing is fitted to the periphery of the spindle 9 above its shoulder 18. The gear 20 preferably has helical teeth which mesh with the teeth of a helical gear 22, shown in dotted lines in Fig. 3, mounted fast on a stub-shaft 23. The stub-shaft 23 is journaled in a bearing 24 formed integral with and depending from the ring 8 and carries a gear 25 at its outer end. The gear 25 meshes with a similar gear 26 fast on the end of a driving shaft 27 journaled in a bearing 28 on the side of the base 2 and projecting outwardly therebeyond. At the outer end of the driving shaft 27 is a belt-pulley 30 which may be connected to the shaft by a clutch or other suitable means, not herein shown in detail. The belt-pulley 30 may be connected to a motor or other source of power to drive the machine by means of the usual belt, or a chain drive or gearing may be substituted therefor.

The flyer comprises a flat plate portion having a central hub 31 keyed to the shaft 9 at 32 with the lower end of the hub abutting the top of the inner race 13 of the upper ball bearing. Rising from the plate portion of the flyer 10 and surrounding its hub 31 in spaced relation thereto is an annular bead or flange 39 which serves a purpose as later explained. A washer 33 surrounding the hub 31 of the head 10 is fastened to the top of the cover 6 by means of screws 34 and carries a packing ring 35 for sealing the opening in the cover to prevent the escape of oil from the base 2 which serves as a reservoir for lubricant. The flyer head 10 is formed with an annular flange 36 projecting laterally from the upper edge of its dished portion. The flange 36 serves as a support for a plurality of vertical columns or posts 37 at the upper ends of which is mounted a flat annulus or ring 40. The posts 37 are preferably constructed in the form of outer tubular sleeves 38 through which project rods 42 held in holes in the flange 36. The upper ends of the rods 42 are reduced in diameter and threaded to screw through holes in the ring 40 and a pair of nuts 43 screwed onto the lower end of each rod serve to tie the parts together. Through this construction the upper ring 40 is rigidly mounted on the flyer head 10 to rotate therewith, its function being to provide a support for the guiding means through which the paper strip S or other strand feeds to the core C.

It will be noted by reference to Fig. 3 that the bottom of the base 2 of the machine has an axial opening to permit the wire or other core C to feed up through the hollow spindle or shaft 9. To prevent the escape of oil through this opening and to protect the core C passing therethrough, a tubular sleeve 45 mounted in the opening extends upwardly nearly to the top of the base. The sleeve 45 is secured within a thimble 46 projecting downwardly through the opening in the bottom of the base 2 with its end threaded to receive a nut 47 which seats a flange 48 on the thimble against the edge of the bore or opening in the base.

Figure 2:
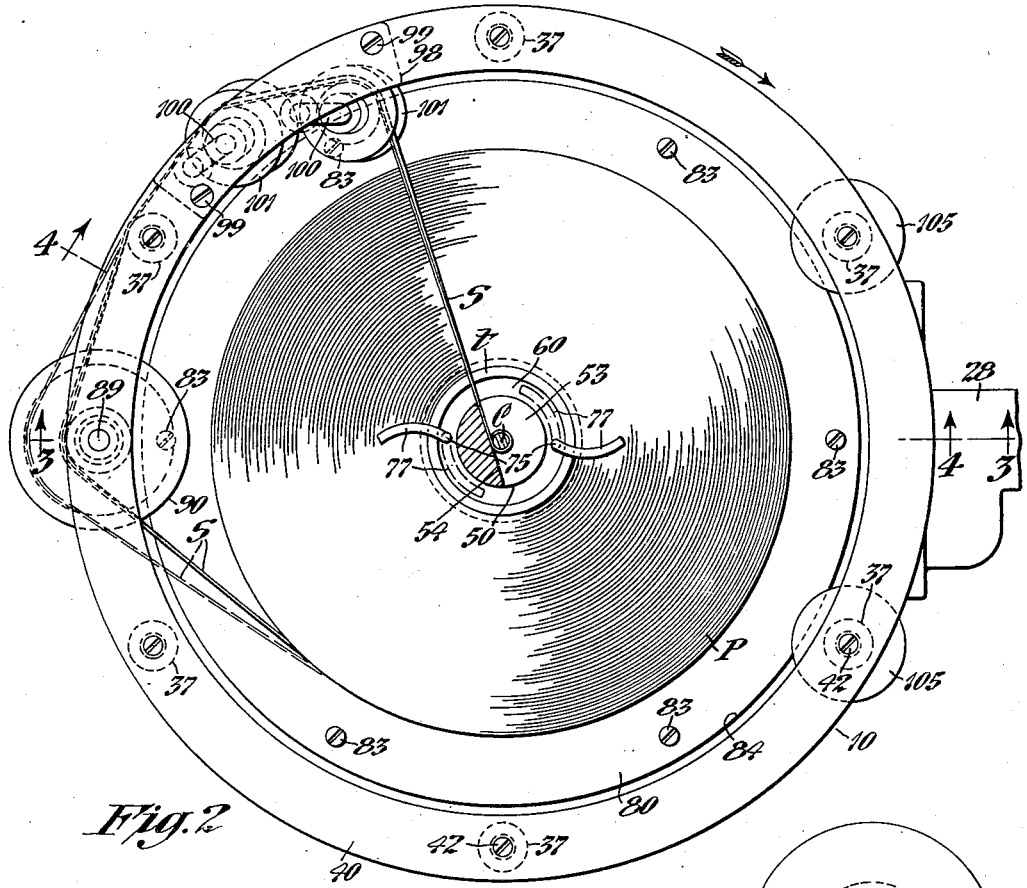
Fig. 2 is an enlarged plan view of the flyer head or rotating element which performs the serving operation.

At the upper end of the hollow shaft 9 is a nosepiece or strand-guide 50 through which the paper strip S feeds to direct it onto the core C. The nosepiece 50 is of cylindrical form with its lower end reduced in diameter at 51 to fit snugly within a finished surface at the upper end of the bore of the shaft 9 with its shoulder abutting the extremity of the shaft. The nosepiece 50 is held in connection with the shaft 9 by any suitable means such as the set-screws 52, shown in Fig. 3, threaded through the walls of the shaft with their ends engaging the reduced portion 51 of the nosepiece. The upper end of the nosepiece 50 is formed with a helical guiding slot 53 arranged at a suitable angle or pitch to guide the paper strip onto the strand to cause it to be wrapped helically therearound without overlapping, one turn on another. For different widths of paper strip, or for materials of other nature, different nosepieces are substituted to adapt the machine for various kinds of work. Referring to Fig. 2, the helical slot 53 terminates in a flat vertical wall 54 against which the strip S bears as it is laid around the core C, this surface acting to press or iron it into place. The nosepiece 50 has an axial tapered bore 55 which is preferably reduced in size toward its upper end to a diameter substantially the same as that of the core being served. Above the helical guide-slot 53, however, the bore is enlarged to accommodate the layer of paper deposited on the core. It will be understood that the core C of wire or other material feeds up from a suitable supply positioned below the machine through the hollow spindle or shaft 9 where it is served or wrapped with the paper strip S.

The material to be served is usually wound on a paper or fiber tube t in the form of a cylindrical package P which is mounted on the hollow spindle 9 to rotate therewith, see Figs. 2, 3 and 4. The package P also has a rotative motion in addition to that of the spindle 9 and head 10 carried thereby in order for it to deliver the material as fast as it is taken up by the serving process. For this purpose the package P is supported on a sleeve or hollow mandrel 60 rotatably mounted on the spindle 9 and provided with means for securing the package rotatively with respect to the mandrel. As herein shown, the package-holder or mandrel 60 is positioned above the end of the hub 31 of the flyer head 10 and is free to slide axially thereof to a slight extent as limited by means of a collar 61 secured fast to the spindle 9 by a set-screw 62 and engaging an internal annular slot 63 in the mandrel or sleeve 60. The slot 63 is formed in the sleeve 60 by counterboring its end and securing a ring 64 therein by suitable means such as the screw 65 shown in Figs. 3 and 4. The collar 61 is of a width slightly less than that of the slot 63 to permit the axial sliding movement of the sleeve or mandrel 60 on the spindle 9 for a purpose as later explained.

The package P is secured fast with the sleeve or mandrel 60 by means of a pair of expansible spring-fingers 70 illustrated in detail in Figs. 5 and 6. The spring-fingers 70 are preferably of arcuate shape positioned in a circumferential slot 71 on the periphery of the sleeve 60, see Fig. 7. The rearward ends of the spring-fingers 70 are secured in the slot 71 by means of screws 72 and the fingers extend from this anchorage radially outward with their ends bent sharply inwardly toward the axis of the spindle 9, thus forming points or teeth for biting into the material of the fiber tube $t$ on which the package P is wound. The ends of the spring-fingers 70 are urged outwardly to engage them with the interior of the tube $t$ by means of small eccentric disks or cams 73 mounted fast on manually rotatable rods 75; the cams being positioned in slots 74 in the sides of the mandrel 60, see Fig. 5, and secured rotatively with the rods 75 by pins 76. The rods 75 are journaled in axially-extending bores in the sleeve 60 with their ends projecting thereabove and bent over at right-angles to form finger-levers 77 at the top. Referring to Fig. 2, the finger-extensions or levers 77 are curved arcuately to adapt them to lie closely adjacent the periphery of the nosepiece 50, as indicated by dash lines in Fig. 2, when the cams 73 are turned to release the ends of the spring-fingers 70. After the package P has been placed on the sleeve or mandrel 60 by sliding its tube $t$ thereover the finger-levers 77 are swung outwardly, as shown by full lines in Figs. 2 and 3, to rotate the cams 73 into the position illustrated in Fig. 6. This turning movement of the cams 73 causes their eccentric portions to ride against the ends of the spring-fingers 70 to force them outwardly to engage in the material of the tube $t$, it being noted that the cams 73 are formed with flat faces 78 which are engaged by inwardly-bent portions 79 at the ends of the spring-fingers to latch the cams in this position. To release the spring-fingers 70 from the interior of the tube $t$ the finger-levers 77 are turned inwardly to the position shown by dash lines in Fig. 2 whereby to rotate the cams 73 until their flat sides 78 are engaged with the inner sides of the spring-fingers 70, as shown in Fig. 5. In this position the spring-fingers 70 are contracted to allow the tube $t$ to be slid onto or removed from the mandrel or holder 60.

The package P is supported vertically under its own weight by means of a saucer-shaped disk or tension-member 80 overlying the head 10 with the rim of the disk overhanging the flange 36. The tension disk 80 is resiliently supported by a plurality of helical springs 81 underlying its outer edge and held in pockets 82 in the flange 36 of the head 10. Screws 83 passing through holes in the rim of the disk 80 are threaded into holes in the rim of the disk 10 with the helical springs 81 surrounding the shanks of the screws. The flange 36 on the head 10 is preferably faced off to form a recess 84 in which the rim of the tension-disk 80 is located, see Figs. 3 and 4. At the center of the tension-disk 80 is an opening 85 surrounding the hub 31 of the head 10 with its rim overlying the upstanding flange 39 on the head. The opening 85 is of sufficient diameter to allow the cop-tube $t$ to be projected therethrough should it extend any considerable distance beyond the end of the package, and the spacing of the flange 39 away from the hub 31 also provides a clearance for this purpose. When the package P is placed on its holder and pressed downwardly the friction of the tube $t$ on the mandrel 60 will force the latter downwardly until the ring 64 at its lower end contacts with the upper end of the hub 31 of the flyer 10; this freedom of movement being permitted by the clearance for the collar 61 in the slot 63. The package P and its tube $t$ are slid downwardly until the outer edge of the package bears against the tension-disk 80 and causes the rim of the latter to seat in the bottom of the recess 84 in the flange 36 of the flyer head 10. At this juncture the central portion of the concavo-convex disk will seat on the top of the flange 39 as shown in Fig. 4 to prevent further downward movement of the package to thereby position it properly on the flyer. After the package has been secured on the mandrel 60 by the gripping means, previously described, pressure on the top of the package is released and the tension-disk 80 will spring upwardly to the position shown in Fig. 3, forcing the package upwardly with it and also sliding the sleeve or mandrel 60 upwardly on the spindle 9 until the collar 61 abuts the side of the ring 64 at the end of the mandrel. Due to this construction and arrangement of the parts the package must be invariably properly placed on its mandrel or holder 60 to insure that the tension-disk 80 will bear against its bottom surface at its outer edge and be held in this position by the compression springs 81. The use of a plurality of springs 81 provides that the tension-disk 80 may rock on a central axis to compensate for irregularities in the shape of the package. The tension-disk 80 will thus support the weight of the package and as the latter is reduced in size the disk is continuously forced upwardly by the springs 81 to maintain its contact with the package.

At one side of the flyer opposite from one of the posts 37 is a vertical spindle 89 carrying a tapered roller 90 around which the tape leads as it feeds to the serving nose 59. The spindle 89 is supported on lathe bearings, its lower end being of conical form with its point in a bore at the end of a screw 92 threaded through the flange 36 on the flyer head 10 and locked in place by a checknut 93. A flanged pin 94 held in a hole in the upper ring 40 has a conical point 95 engaged in a bore in the upper end of the spindle 89, the parts above described providing friction-reducing bearings for the spindle on the flyer head to adapt the roller 90 to rotate freely as the strand of tape S passes thereover. The roller 90 may be constructed of wood, fiber or other suitable material with its periphery tapered inwardly from the top to the bottom and preferably provided with beveled spool-flanges at its opposite ends. The roller 90 is bored to receive the spindle 89 and is held fast thereon by means of collars 96 at its opposite ends secured to the spindle by set-screws 97.

Supported from the upper ring 40 is a bracket 98 secured fast thereto by any suitable means such as the screws 99, shown in Figs. 2 and 4. Projecting downwardly from the bracket are two inclined spindles 100 on which are journaled a pair of spool-shaped rollers 101. The rollers 101 may be held in place on their spindles 100 by opposite collars 102 fastened by set-screws 103. The strip of paper S or other material passes from the conical roller 90 and leads around the two auxiliary rollers 101 which are positioned at the proper angle to direct the strip into the helical groove 53 in the nosepiece 50. The inclination of the axes of the rollers 101 adapts them to distribute the tension on the paper strip equally throughout its width to eliminate any tendency for it to tear or unfold. The purpose of the conical roller 90 is to provide for a uniform rate of delivery of the serving material or strip S from the package P under a constant tension as it unwinds from one end to the other end of the package. Since obviously the tape must be applied to the core C at a point beyond the end of the package P there would ordinarily be a variation in the rate of turning movement of the package as the strip unwinds from one end to the other end of the package. In other words, the package would rotate at a slower rate as the strip unwinds from the end of the package adjacent its point of application to the core than when it unwinds from the opposite end of the package. Consequently, the package would be rotated with an intermittent or jumping motion and this would cause a variation in the tension maintained on the strand and result in uneven application of the paper to the core. Since it is necessary to maintain a substantial tension on the strip to insure its being wrapped snugly around the core considerable torsion is applied to the feeding core. That is to say, the serving operation tends to twist the core and if the tension is relieved intermittently there will be a tendency for the core to twist back again causing the tape to wrap on itself or pile, resulting in bunches or inequalities in the covering. The functioning of the device to prevent such irregularities or faults in the covering is explained more fully hereinafter.

On two of the posts 37 located in diametrical opposition to the roller 90 and the auxiliary rollers 101 are placed cylindrical weights 105 for counterbalancing the flyer against the effect of centrifugal force tending to cause it to gyrate or run out.

Any suitable means may be provided for feeding the core through the machine and, as illustrated in Fig. 1 of the present drawings, a take-up wheel or capstan 115 is mounted on an elevated framework supported from the bed 4. Bolted to the table or bed 4 are brackets 116 having sockets for supporting vertical rods or stanchions 117 connected at the top by a cross-strut 118. The capstan 115 is journaled on a shaft 119 mounted on the cross-strut 118 and is arranged to be driven by any suitable means not herein shown in detail. The driving means for the capstan 115 may be constructed and arranged as shown in United States Letters Patent No. 1,968,240 dated July 31, 1934, comprising gearing or sprocket and chain connections with the driving shaft of the machine. The covered core C is given several turns about the capstan 115 and thence leads downwardly to be taken up by a wind-up reel below the machine, these parts not being herein shown as they may be of any usual arrangement.

Figure 8:
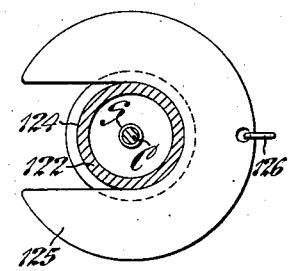
Fig. 8 is a sectional view on line 8—8 of Fig. 1 showing the clip for holding the reserve supply of serving material in position above the flyer head.

As the covered core feeds upwardly from the flyer it passes through a tubular member 122 supported by a bracket 123 bolted to the cross-strut 118 of the upper framework above described. The vertical member 122 is employed as a support or holder for several reserve packages of the paper strip or other serving material, being of such length as to accommodate as many packages as desired. The purpose of this arrangement is to provide that after the exhaustion of a package carried by the flyer, other packages may be applied thereto without cutting the core so that relatively long lengths of the wire or other core may be served with the strip material. The lower end of the tubular member 122 is formed with a circumferential slot 124, see Fig. 8, which is engaged by a slotted disk or horseshoe-shaped member 125. The reserve packages are slipped onto the lower end of the member 122 and slid upwardly to be held in position by sliding the disk or member 125 into the slot 124 where it is engaged by the end of the tube t of the lower package to support the several reserve packages in the series.

Figure 9:
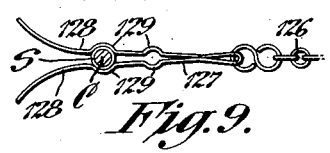
Fig. 9 is a sectional view on line 9—9 of Fig. 1 showing the spring-clip for engaging the covered core to prevent the serving material from unwrapping therefrom.

Connected to the ring or disk 125 by a chain 126 is a spring-clip 127 shown in edge view in Fig. 9. The clip 127 is of bifurcated form with opposite spring-arms 128 formed with arcuately-bent portions 129 adapted to engage around the covering on the core C. Preferably, there may be two or more of the arcuately formed recesses 129 in the sides of the spring-arms 128 to accommodate different sizes of core. The spring-arms 128 of the clip 127 have their ends bowed outwardly to provide a reentrant opening or mouth which adapts the clip to be sprung onto the covered core. As the core feeds through the machine the friction of the spring-clip 127 engaging the sides of its covering will maintain the clip in raised position abutting the lower end of the tubular member 122. The purpose of the clip 127 is to prevent the paper strip or other serving material from unwrapping from the core should the end break during the serving operation or when its supply runs out.

Referring to Fig. 1 of the drawings, a cylindrical guard-wall is preferably provided surrounding the flyer head 10 to protect the operator from injury during the rapid rotation of the latter. The guard 130 is made in two semi-circular sections with one part 131 fixed and the other part 132 slidable with respect thereto in the form of a door which can be opened for inspection of, and attention to, the moving parts of the machine enclosed thereby. The guard 130 is supported from brackets 133 fastened to the rods or stanchions 117 by means of set-screws 134. Extending inwardly from the brackets 133 are angle-shaped arms 135 to which are bolted three relatively thin flat rings 136, 137 and 138. The outer fixed guard-wall 131 is held in place between the outer ring 136 and the ends of the arms 135 and at its upper edge the metal is rolled or spun inwardly to form a guideway for the upper edge of the inner wall 132 which slides therein. The lower edge of the inner wall 132 slides between the outer and inner rings 136 and 137, being seated on the third intermediate ring 138 which forms a spacer between the other two rings. The inner wall 132 may be made in a single piece or, as herein shown, it may be split into two parts which serve as opposite sliding doors. Projecting from the forward ends of the doors are pins 139 serving as handles which may be grasped to slide the two parts of the inner wall into closed position at the front of the machine. The improved machine or apparatus having now been described in detail its method of operation will next be explained.

To prepare the machine for operation a package P of the serving material is placed on the mandrel 60; the finger-levers 77 being first turned inwardly to the position indicated by dash lines in Fig. 2 to permit the tube $t$ to slide onto the mandrel. The package is pressed downwardly until its lower end engages the tension-disk 80 and the pressure continued until the center of the disk rests on the flange 39 and its rim is seated against the bottom of the recess 84 in the flange 36 of the flyer head 10 as shown in Fig. 4 of the drawings. During this operation the friction of the tube $t$ on the mandrel 60 forces the latter downwardly until its end seats against the upper end of the hub 31 of the flyer head 10. While the package is still pressed downwardly the finger-levers 77 are swung outwardly to rotate the cams 73 from the position shown in Fig. 5 to that illustrated in Fig. 6. The cams 73 are thus caused to expand the spring-fingers 70 to force their ends into the material of the tube $t$ whereby to grip the tube to the mandrel 60 to secure the package rotatively therewith. Pressure on the package is then released, whereupon the tension-disk 80 will be forced upwardly by the compression springs 81, thereby sliding the mandrel 60 upwardly to an extent permitted by the engagement of the collar 61 with the ring 64 at the end of the bore in the mandrel.

A reserve supply of the serving material is next applied to the machine by placing one or more packages P on the upper fixed holder 122, the latter being of such length as to hold any desired number of packages. The reserve packages P are held in place on the holder 122 by sliding the disk 125 into its slot 124 at the lower end of the holder. The core C to be covered is now led up through the center of the machine by passing it through the tubular sleeve or quill 45, thence through the hollow spindle 9 and the nosepiece 50. From the nosepiece 50 the core is carried up through the reserve supply-holder 122, passed several times around the capstan 115 and thence led down to the take-up reel, not herein shown.

The end of the paper strip S is drawn off from the periphery of the package P, carried around the conically tapered roller 90, thence around the rollers 101 and fastened to the core by any suitable means; after which the strip is placed in the guide-slot 53 of the nosepiece 50. The doors of the inner guard wall 132 are then slid forwardly into closed position and the machine is ready to operate.

To operate the machine power is applied to the driving shaft 27 by shifting the clutch or otherwise causing the pulley 30 to drive the shaft. The gear 26 on the shaft 27 drives the gear 25 on the stub-shaft 23 and through the gears 20 and 22 rotation is imparted to the vertical shaft 9 at a high rate of speed. As before stated, the flyer head 10 is keyed fast to the shaft 9 so that the flyer and the parts carried thereby are rotated therewith.

As the flyer is rotated about its vertical axis the package turns with it and as the paper strip is drawn off therefrom it imparts an increment of movement to the package with its holder or mandrel 60 turning about the shaft 9. The rotation of the package P is controlled by the tension-disk 80 which bears against its under side and is pressed upwardly by the compression springs 81 as the package diminishes in diameter; it being understood that the weight of the package is sustained solely by the tension-disk 80. As the strip unwinds from the package P the latter is reduced in diameter and the tension-disk 80 is pressed upwardly by its springs 81 to maintain it bearing against the under side of the package continuously throughout the serving operation. As the size of the package decreases its weight diminishes and this tends to relieve the friction between the bottom of the package and the tension-disk 80. Thus, as the package rotates faster in proportion to its diminishing size the resistance to its rotation applied by the disk 80 is lessened so that the tension on the delivering strand remains substantially constant.

As the paper strip S feeds from the package P it draws around the tapered roll 90 and thence leads across the peripheries of the inclined auxiliary rollers 101, whence it feeds to the guiding groove 53 in the serving nose 50. It has been explained that the take-up wheel or capstan 115 is rotated from the driving mechanism of the machine to feed the core C through the machine at the required rate to cause the strip to be wrapped helically around the core without overlap at its edges. After the machine has been started and a length of the core has been wrapped or covered with the paper strip S the spring-clip 127 is applied over the strip to prevent it from unwrapping should the strip break or when its end runs out.

When the serving package P on the flyer is exhausted its tube $t$ is withdrawn from the mandrel 60 by releasing the spring-fingers 70. This is accomplished by turning the finger-levers 77 inwardly to the position indicated by dash lines in Fig. 2 to rotate the cams 73 to the position shown in Fig. 5 of the drawings. Preferably, the tube $t$ is split longitudinally to facilitate its application to and removal from the mandrel 60; or it may be slitted with a knife before its removal from the mandrel. A reserve package P of the paper strip is then applied to the flyer head 10 by removing the spring-clip 127 from the wrapped core and withdrawing the member 125 from the slot 124 in the tubular holder 122; the end of the wrapped strip on the core C being fastened in place by adhesive tape before removing the spring-clip 127. The package P can then be slipped off from the holder 122 and applied to the rotatable holder or mandrel 60 in the manner previously explained; after which the member 125 is slipped into its slot 124 again to retain the remaining reserve package or packages in place on the holder 122. The spring-clip 127 is again applied to the covered core and the paper strip drawn off from the package on the flyer, led around the guide-rolls 90 and 101, placed in the guiding groove 53 of the nose 50 and attached to the core. The machine may then be started again to continue its operation until the supply of strip material on the new package is exhausted.

It has been explained that as the strip leads around the compensating roller 90 it will ride up and down the inclined side thereof to cause it to deliver to the core at a uniform rate with the tension on the strip remaining constant. As the strip S unwinds toward the lower end of the package P it would normally be required to rotate the package faster than when it delivers from the upper end or nearest its point of application to the core. However, as the strip rides up the incline of the compensating roller 90 it will be taken up faster thereby so as to maintain its rate of feed to the core C substantially uniform and therefore the package will have a substantially uniform speed of turning movement about its axis. With the rotation of the package maintained uniform, except for its gradual acceleration during its reduction in size, the pressure applied to the package by the disk 80 will be constant and hence the tension on the strip will not vary at its point of application to the core. It has been explained that the tension of the strip exerts a torsion on the core tending to twist the latter about its own axis and if fluctuations occurred in the amount of tension the core would twist back and forth to cause an uneven disposition of the strip thereon. Stated briefly, if the tension on the strip were relieved at intervals the uneven torsion on the core would cause the latter to untwist and wind on the strip at a faster rate so that it would overlap or pile resulting in bunches or enlargements at intervals along the length of the core. By the provision of the present improved compensating device for maintaining the tension on the strip constant as it feeds from the package to the core such irregularities and faults in the covering are eliminated and an improved product produced. Moreover, due to the uniform feed of the serving material and the constant tension maintained thereon, the present machine may be operated at higher speeds than have heretofore been possible in serving or wrapping apparatus of the present type, and consequently it is capable of increased production with corresponding economies.

Figure 10:
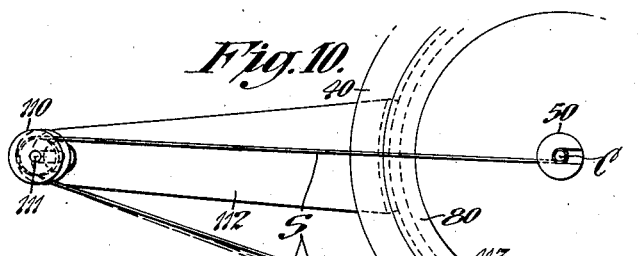
Fig. 10 is a view in reduced scale showing a modified form of the guiding means through which the serving material is fed from the package to the core.
Figure 11:
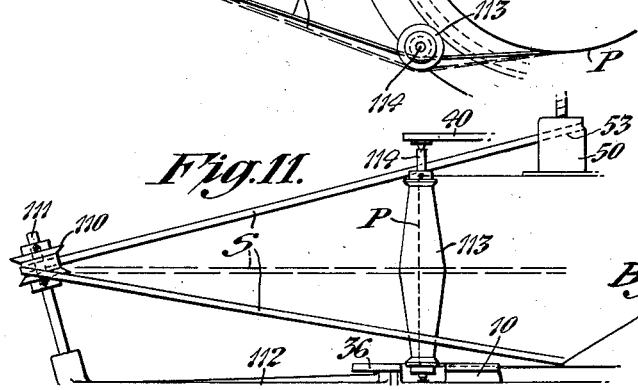
Fig. 11 is a side elevation of the same illustrating a modified form of the compensating take-up roll.

Figs. 10 and 11 of the drawings illustrate a modification in the form of the guiding means for the tape and the compensating roller which cooperates therewith. In this latter form of construction an auxiliary guide-roller 110 is arranged centrally of the ends of the package and located some distance outwardly therefrom, being journaled on a spindle 111 carried by a radially-projecting arm 112 on the flyer head 10. From the roller 110 the tape leads directly to the slot 53 in the nosepiece 50 and between the roller 110 and the package is a compensating roller 113. The roller 113 is mounted fast on a spindle 114, similar to that previously described, the spindle being likewise journaled in bearings on the flange 36 of the flyer head 10 and the upper ring 40. The roller 113 takes a different form, however, being of double truncated shape with its largest diameter at the center and its periphery tapering toward its ends. With the form of roller 113 shown in Fig. 11, the strip S is taken up faster by the roller as it delivers from the center of the package and at a less rapid rate toward its ends so that its rate of delivery at the point of application to the core is maintained uniform as the package is rotated at a uniformly increasing rate of speed during its reduction in diameter by the unwinding of the material therefrom. The tension on the strip is therefore maintained constant throughout the whole serving operation.

Fig. 12 illustrates a still further modified form of the compensating guide-roller for the strand-material delivering from the package P. In this form of construction the roller 140 is of cylindrical shape and its axis of rotation is inclined at an angle to the axis of the package P to cause the strip S passing thereover to be delivered to the core C at a uniform rate with an even rotative motion of the package as the material unwinds from end to end thereof. The roller 140 is mounted free to rotate on an inclined spindle or shaft 141 secured in a boss 142 on the rim 36 of the flyer head 10 by a set-screw 143; the upper end of the spindle 141 being held in a bore in a boss 144 on the overhead ring 40. The roller 140 is held against axial movement on the spindle 141 by collars 145 secured to the shaft by set-screws 146. In this latter embodiment of the invention the operation of the device is substantially the same as that previously described, in that the paper strip S travels up and down the roller 140 to take it up at such a rate that the package is rotated uniformly to maintain a constant tension on the delivering strip.

It will be observed from the foregoing that the present invention provides a machine capable of serving or wrapping strand or strip material onto a core at a high rate of speed to produce a superior product. Moreover, the present machine provides for convenient placing of the supplies on the flyer and for resupplying the latter when one supply has been exhausted. The improved holding means for the package insures against misapplication of the supplies to the flyer while providing that the tension applied to the rotating package will be maintained constant with a uniform rate of delivery of the material to the core being covered.

While the present invention is herein illustrated and described in its preferred embodiment, with two modified forms of construction, it is to be understood that other changes may be made in the structure and arrangement of the parts of the apparatus without departing from the spirit or scope of the invention. Therefore, without limiting myself in this respect, I claim:

1. In a serving apparatus, a rotary flyer, means for rotatably supporting a cross-wound package of strip-like serving material on the flyer, said package being considerably greater in length than the width of the strip-material, means for feeding a core axially through the flyer, means for guiding the material from the package to apply it helically to the core adjacent one end of the package, and means for guiding the strip as it unwinds from one end of the package to its opposite end comprising a guiding surface of a length several times the width of the strip-material, said surface being inclined to the axis of the package and located between the latter and the first guiding means, the strip of material passing over said inclined guiding surface to adapt it to travel therealong to compensate for variations in the rate of delivery of the material between the ends of the package whereby to maintain a uniform rotative movement of the package.

2. In a serving apparatus, a rotary flyer, means for supporting a cross-wound package of strip-material for rotation about the axis of the flyer, said package being considerably greater in length than the width of the strip-material, means for applying resistance to the rotation of the package on the flyer to tension the material, means for feeding a core through the flyer axially thereof, means for guiding the strip-material from the package to the core to deposit it in helical coils thereon, and a second guiding means positioned between the first guiding means and the package and having a surface of a length several times the width of the strip-material and inclined to the axis of the package over which the strip leads with a travel back and forth thereon whereby to compensate for variations in the rate of delivery of the strip as it unwinds from end to end of the package to maintain a uniform rate of delivery of the strip to the core with a constant tension thereon.

3. In an apparatus for serving or wrapping strip-material about a core, the combination of a rotary flyer, means for rotatably supporting a cross-wound package of strip material on the flyer, means for feeding a core through the flyer axially thereof, guiding means for directing the material helically onto the core adjacent one end of the package, a second guiding means intermediate the package and the first guiding means, and a roller carried by the flyer with its axis parallel to the package, said roller having a tapered surface of a length several times the width of the strip around which the strip leads to compensate for variations in the rate of delivery of the strip as it unwinds from end to end of the package.

4. In an apparatus for serving or wrapping strip material about a core, the combination of a rotary flyer, means for feeding a core through the flyer axially thereof, means for supporting a cross-wound package of strip-material for rotation about the axis of the flyer, said package being of a length several times greater than the width of the strip-material, tension means for resisting the rotation of the package with respect to the flyer, means adjacent one end of the package for guiding the material to wrap it helically about the core, auxiliary guiding means for the strip located outwardly beyond the periphery of the package, and a compensating guide-roller rotatable on the flyer with its axis parallel with the axis thereof, said roller being of a length several times greater than the width of the strip and having a tapered periphery around which the strip leads to maintain its rate of delivery to the core uniform and the tension thereon constant as it unwinds from end to end of the package.

5. In an apparatus of the type indicated, the combination of a rotary flyer having a hollow axial shaft, means for feeding a core through the shaft of the flyer, a holder rotatable on the shaft of the flyer for supporting a package of strip-material, a thin sheet-metal tension-disk arranged axially of the flyer, resilient means for pressing said disk against the bottom of the package on the flyer to resist the rotation thereof, means for guiding the strip-material from the package to the core to deposit it helically thereon, auxiliary guiding means carried by the flyer outwardly beyond the package, and a tapered roller having a length several times greater than the width of the strip and arranged between the auxiliary guiding means and the package to adapt the strip-material to draw therearound to regulate its delivery from the package to maintain the tension on the strip constant as it delivers to the core.

6. In an apparatus of the type indicated, the combination of a rotary flyer having a hollow spindle, means for feeding a core through said spindle axially thereof, means for supporting a package of strand material on the flyer for rotation about the spindle, means for guiding the material from the package to deposit it helically on the core, and a spring-clip adapted to be sprung onto the wrapped core to prevent the material from unwrapping therefrom when the strand breaks or its end runs out.

7. In an apparatus of the type indicated, the combination of a rotary flyer having a hollow spindle, means for feeding a core through the spindle axially thereof, means for supporting a cross-wound package of strip-material for rotation about the axis of the flyer, a nosepiece at the end of the spindle having means for guiding the strip-material to lay it helically upon the core, a pair of auxiliary guiding rollers journaled on the flyer with their axes inclined to the axis thereof, and a compensating roller journaled on the flyer and having a guiding surface substantially equal to the length of the package and several times greater than the width of the strip, said guiding surface being arranged at an inclination to the axis of the package.

8. A flyer comprising a rotary head, a thin sheet-metal tension-disk adapted to seat against said head, resilient means for normally maintaining said tension-disk raised above the head, and a mandrel rotatable on the head for supporting a package of serving material, said mandrel being slidable vertically of the head to allow the package to rest on the tension-disk under its own weight.

9. In a flyer, the combination of a rotary head, a ring rigidly supported above the head, means for supporting a package to rotate about the axis of the head, tension-means for applying resistance to the rotation of the package with respect to the head, guiding means carried by the ring above the head for directing the strand material from the package to a core passing axially through the flyer, and a second guiding means supported between the head and the ring and arranged with its guiding surface inclined at an angle to the axis of the package.

10. In a rotary flyer, the combination of a head, a mandrel rotatable about the axis of the head for supporting a package of serving material, spring-fingers anchored to said mandrel with their free ends adapted to engage the interior of the package to secure it rotatively with the mandrel, vertical rods pivoted in the walls of the mandrel and having finger-levers projecting thereabove to swing radially outward with respect thereto, and cams on said rods engaging the spring-fingers on the mandrel to expand the latter into engagement with the interior of the package.

11. In a flyer, the combination of a rotary head, a hollow spindle for rotating the head, a sleeve-like mandrel rotatably mounted on the spindle to adapt it to support a package of serving material, spring-fingers anchored at one end to the mandrel to adapt their free ends to engage the interior of the package to secure it to the mandrel, rods rotatably supported in the walls of the mandrel and having finger-levers at their upper ends projecting across the top of the mandrel, and cams on said rods rotatable thereby to expand the spring-fingers into engagement with the interior of the package, said cams having relatively flat faces engageable with the spring-fingers to maintain the latter expanded.

12. In a flyer, the combination of a rotary head, a hollow spindle for rotating the head, a sleeve-like mandrel rotatably mounted on the spindle to adapt it to support a package of serving material, arcuately-shaped spring-fingers anchored at one end to the mandrel with their free ends bent radially inward to form shoulders adapted to engage the interior of the package held on the mandrel, cams engaging the spring-fingers to expand the latter, and means at the end of the spindle for rotating the cams, said cams having relatively flat faces adapted to engage respectively with the sides of the springs and the inwardly-bent end portions thereof to lock the cams to hold the springs in either contracted or expanded position.

WILLARD W. BARDSLEY.